United States Patent
Purman

[11] 3,789,249
[45] Jan. 29, 1974

[54] APPARATUS FOR COOLING A HERMETIC MOTOR

[75] Inventor: Joseph W. Purman, Milwaukee, Wis.

[73] Assignee: The Louis Allis Company, Milwaukee, Wis.

[22] Filed: Sept. 5, 1972

[21] Appl. No.: 286,421

Related U.S. Application Data

[63] Continuation of Ser. No. 107,177, Jan. 18, 1971, which is a continuation-in-part of Ser. No. 38,269, May 18, 1970, abandoned.

[52] U.S. Cl. .................................. 310/54, 310/58
[51] Int. Cl. ............................................ H02k 9/20
[58] Field of Search ....... 310/54, 53, 58, 59, 62–64; 62/117.6, 505

[56] References Cited
UNITED STATES PATENTS

| | | | |
|---|---|---|---|
| 3,150,277 | 9/1964 | Chubb | 310/54 |
| 3,413,499 | 11/1968 | Barton | 310/58 |
| 3,020,427 | 2/1962 | Wheeler | 310/59 |
| 3,416,330 | 12/1968 | Weller | 62/505 |
| 3,146,605 | 9/1964 | Rachfal | 310/54 |
| 3,188,833 | 6/1965 | Robinson | 310/54 |
| 3,388,559 | 6/1968 | Johnson | 310/54 |
| 3,479,541 | 11/1969 | Robinson | 310/54 |

Primary Examiner—R. Skudy

[57] ABSTRACT

A hermetically sealed electric motor suitable for use in a refrigeration system has an annular chamber formed about the stator. The chamber is filled with a coolant, such as the system refrigerant. A selected portion of the coolant is supplied by a pipe from the annular chamber to a channel formed by a stationary baffle. A rotor fan located in the channel distributes coolant circumferentially around the motor gap and urges axial flow of the coolant through the gap. Additionally, a dispensing outlet may be formed in the annular chamber to allow coolant to flow to the rotor assembly at the rotor end opposite the channel.

11 Claims, 3 Drawing Figures

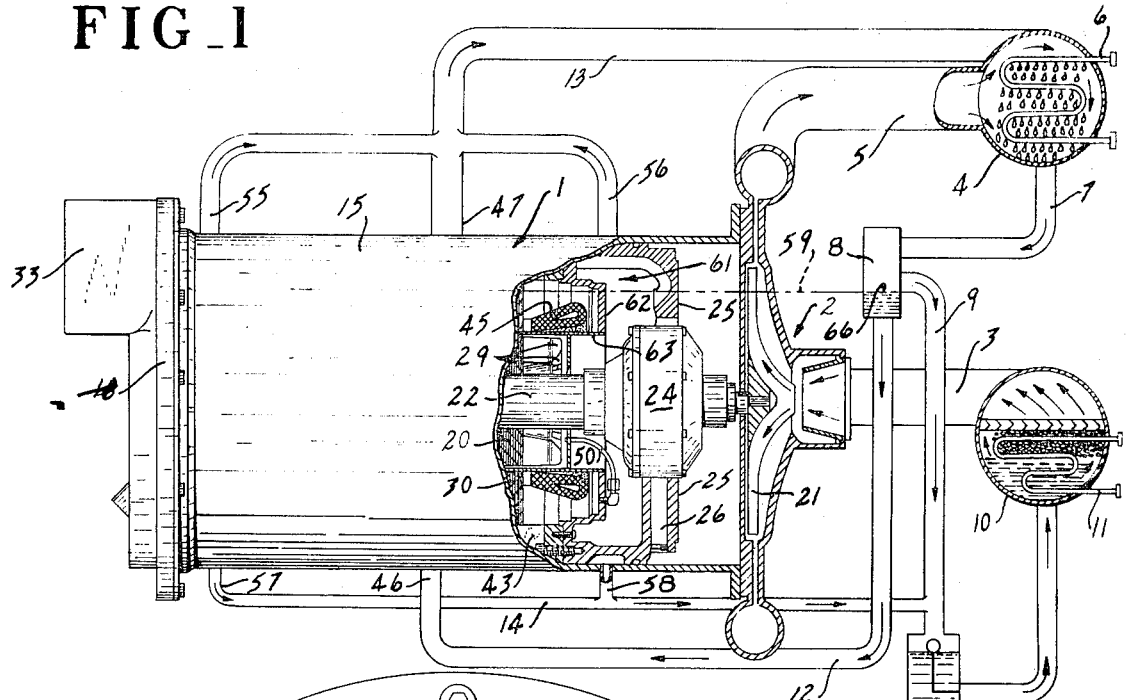
FIG_1
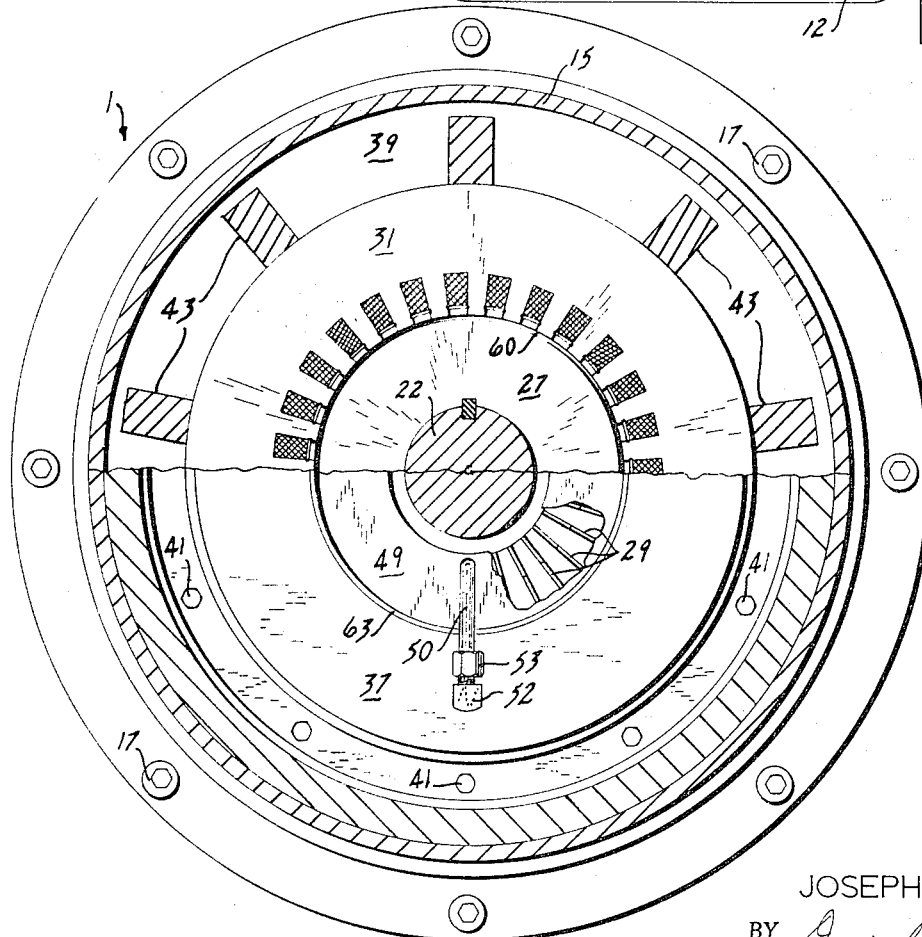
FIG_3
INVENTOR.
JOSEPH W. PURMAN

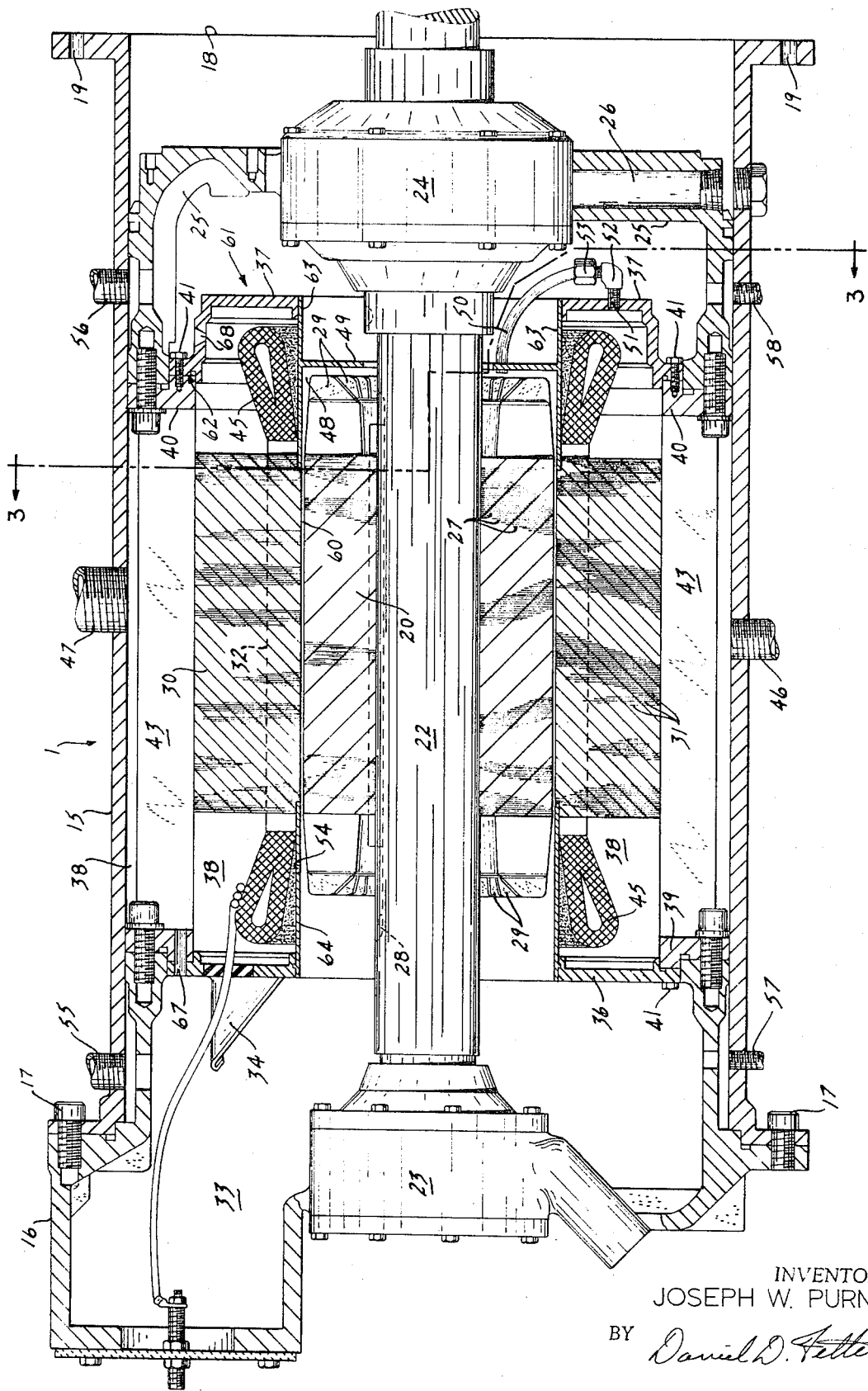
FIG_2

APPARATUS FOR COOLING A HERMETIC MOTOR

This is a continuation, of application Ser. No. 107,177 filed Jan. 18, 1971. application Ser. No. 107,177 is a Continuation-in-Part of application Ser. No. 38,269 filed May 18, 1970. application Ser. No. 107,177 was filed before the abandonment of application Ser. No. 38,269.

BACKGROUND OF THE INVENTION

This invention relates to improvements in the cooling of dynamo-electric machines, and more particularly to apparatus for cooling an electric motor encased in a hermetically sealed enclosure.

Motors so encased are often used in refrigeration systems to drive the system compressor thereby to facilitate the sealing of the system. Because the hermetically sealed enclosure impedes cooling of such motors by conventional means, the motors have been cooled by using a liquid coolant, typically the system refrigerant, as a heat exchange medium.

In one mode of operation, liquid coolant is injected inside the machine and allowed to flow over and around the rotor and stator assemblies. Such coolant flow effectuates direct contact with rotor and stator assemblies to provide heat exchange.

The aforementioned direct contact heat exchange has been found to be a highly desirable method of cooling the motor, and particularly the rotor assembly and motor gap areas thereof, but the high velocity liquid coolant sprays produced by such techniques represent a potentially dangerous source of erosion to the exposed end coils of the stator winding.

Enclosed stator chambers have also been employed wherein a sealed chamber is constructed around the outer periphery of the stator into which low velocity coolant is directed to provide heat exchange to the stator assembly. Such systems avoid potential erosion problems but fail to provide effective cooling to the gap and rotor areas.

SUMMARY OF THE INVENTION

It is therefore the object of the present invention to provide apparatus for uniformly cooling both the rotor assembly and the stator assembly of a hermetically sealed motor in a highly effective, safe manner.

It is a further object of the present invention to achieve such effective and uniform cooling in a simple, economical and trouble free manner.

In accordance with the present invention, a hermetically sealed electric motor is provided with an annular chamber in sealed engagement with the stator assembly. Coolant is accumulated in the chamber to immerse the stator assembly and form a cooling bath for the stator assembly. A selected amount of coolant is supplied from the annular chamber to the annular gap area formed between the rotor and stator asemblies for further cooling. Specifically, a conducting tube is connected to the annular chamber to conduct a selected amount of coolant to the gap area. A stationary baffle or dam is constructed within the hermetically sealed electric motor and positioned to channel the coolant into the gap. A distributing means, connected to the rotor, is positioned in the channel to circumferentially distribute the coolant around the gap and to urge it axially through the gap.

Outlets are placed in the motor enclosure to remove coolant from the annular chambers and from the rotor assembly area.

In another aspect of the invention, a dispensing outlet may be formed in the sealed annular chamber to allow coolant to flow from the chamber to the rotor assembly at the rotor end opposite to the channel. Thus, additional coolant is applied to the rotor for optimum cooling.

It is thus apparent that the present invention provides a highly efficient yet trouble free structure for cooling the rotor and stator assemblies of a hermetically sealed electric motor.

BRIEF DESCRIPTION OF THE DRAWING

The drawing furnished herewith illustrates the best mode presently contemplated by the inventor for carrying out the invention and clearly discloses the above advantages and features as well as others which will be readily understood from the detailed description of the invention.

In the drawing:

FIG. 1 is an elevational view of a typical refrigeration system including a hermetically sealed electric motor cooled by a coolant, portions of the view being broken away to reveal the interior of the motor;

FIG. 2 is a detailed vertical sectional view of the motor of the present invention; and FIG. 3 is a sectional view taken along line 3—3 of FIG. 2.

DESCRIPTION OF THE PREFERRED EMBODIMENT

Referring to the drawings, FIG. 1 shows a refrigeration system including a hermetically sealed motor 1 connected to drive a compressor 2. Vaporized refrigerant enters compressor 2 through pipe 3, becomes compressed, and passes to conductor 4 through pipe 5. Cooling water is circulated through condenser 4 to condense the coolant into liquid form in which form it exits through pipe 7 into reservoir 8. Reservoir 8, which may comprise a system economizer, supplies liquid coolant through pipe 9 to evaporator 10. A secondary medium, such as water, connected to the cooling load, is passed through evaporator 10 by tubing 11 and provides heat which evaporates the coolant into vapor which exits into pipe 3 and returns to compressor 2, thereby completing the normal refrigeration cycle. The specific construction and operation of the compressor, condenser, and evaporator are well known to those skilled in the art and further description thereof is deemed unnecessary. It will also be appreciated that, while a single stage compressor is shown and described herein, the refrigeration system may incorporate a multistage compressor.

As best shown in FIG. 2, motor 1 is of the totally enclosed type having a cylindrical casing 15 enclosed at the ends by end wall 16 and compressor 2. Specifically, end wall 16 is connected in sealed engagement to casing 15 by a series of circumferentially spaced bolts 17 while compressor 2 is joined at circumferential edge 18 of casing 15 in similar manner (not shown) at the circumferentially spaced holes 19.

A rotor assembly 20 is mounted within motor 1 and coupled to drive the impeller 21 within compressor 2. Rotor shaft 22 is supported by a suitable bearing 23 mounted in end wall 16 and by a similar bearing 24 positioned in casing 15 by bearing brackets 25. An oil inlet 26 is placed within the bearing bracket to supply lubrication to the bearing assembly.

Rotor assembly 20 further contains a plurality of rotor laminae 27 attached in secured engagement to shaft 22 through key slot 28. Rotor assembly 20 further includes a conventional squirrel cage motor winding having shorting end rings to which may be attached axially extending fan blades 29 to circulate coolant as will more fully be described.

A stator assembly 30 cylindrically surrounds motor assembly 20 and is formed of a plurality of cylindrical stator laminae 31. Laminae 31 are of customary design and contain coil slots for positioning stator windings 32 having end turns 45. Windings 32 electrically connected to, and energizable by, an external power source (not shown) through terminal box 33 and shielding 34 for effectuating electro-mechanical energy conversion across gap 60 in a manner well known to those skilled in the art.

An annular chamber is formed within motor 1 to embrace stator assembly 30, including winding end turns 45. As shown somewhat diagrammatically in FIG. 1, this chamber is formed by an enclosure means 61 which consists of an annulus 62 extending radially inward from motor assembly casing 15 and axially extending tube 63, fastened at one end to stator assembly 30 adjacent gap 60 and fastened at the other end to annulus 62. A similar structure is provided at the other end of stator assembly 30 so that the two enclosure means and the portion motor assembly casing 15 between them define an annular chamber or jacket 38 around the outer periphery of stator assembly 30.

FIG. 2 shows, in detail, the construction of enclosure means 61. The annuli 62 referred to above include supporting rings 39 and 40 axially positioned by circumferentially spaced bars 43. During fabrication of motor 1, stator laminae 31 are pressed into the cage formed by bars 43 so as to be positioned in the desired alignment with rotor 22 and bearing assembly 24 mounted on supporting ring 40 by bearing brackets 25. The aforesaid motor assembly, including supporting rings 39 and 40, bars 43, stator assembly 30 and rotor 22 is pressed into housing 15 and positioned as shown in FIG. 1 to form the completed motor.

A pair of sealing rings 36 and 37 are fastened to supporting rings 39 and 40, respectively, by bolts 41 and extend radially inwardly from motor casing 15 to approximately gap 60 to complete the construction of annuli 62. Tubular members 63 and 64 extend between the outer laminae of stator assembly 30 and sealing rings 36 and 37, respectively, to complete the formation of annular chamber 38.

Reservoir 8 is connected through pipe 12 to inlet conduit 46 which provides an opening to annular chamber 38. The level of liquid coolant 59 within chamber 38 is established by reservoir 8 and is sufficiently high as to immerse stator windings 32 and end coils 45. Pipe 9 is attached as an overflow from reservoir 8 thereby establishing a reservoir level 66 which provides a liquid head sufficient to support liquid level 59 in chamber 38, as best shown in FIG. 1.

As heat transfer occurs between stator assembly 30 and the coolant, the coolant boils off and exists through outlet conduit 47 and pipe 13 and returns to condenser 4 or to an economizer, if the refrigeration system is provided with same.

To effectively cool rotor assembly 20, a selected amount of coolant is supplied from annular chamber 38 to a channel 48 which is located at one end of rotor assembly 20. A stationary baffle 49 is cylindrically connected to tubular member 63 to form channel 48 containing fan blades 29. A conducting tube 50 passes through baffle 49 and is connected to annular chamber 38 through sealing ring 37 by tap 51, elbow 52, and locking nut 53.

Coolant entering channel 48 is driven circumferentially about the periphery of rotor assembly 20 by fan blades 29 and urged through gap 60 to provide heat transfer and cool the rotor and stator assemblies. Fan blades 29 thus form a coolant distributing means. Stator end turns 45 are protected from the high velocity coolant sprays created by fan blades 29 by tubular members 63 and 64.

It has been found that in some types of motors, fan blades 29 may be eliminated and adequate circumferential and axial flow of the coolant obtained by the fanning action of the rotor shorting end ring alone. This is due to the skin friction and windage associated with the revolving end ring. Hence the term "coolant distributing means" in the claims is to be taken in the generic sense of a means for providing the desired circumferential and axial coolant flow and is not limited to a bladed or vaned means.

Coolant that has circulated about rotor assembly 20 and vaporized, is withdrawn from the sealed motor assembly through pipes 55 and 56 which are connected to pipe 13 for return to condenser 4, or to the economizer. In the alternative, coolant vapor may be allowed to pass into annular chamber 38 through passages 67 and 68 located in sealing rings 36 and 37. Coolant remaining in liquid form is allowed to drain through pipes 57 and 58 and returns to evaporator 10 through pipe 14.

If desired, a dispensing outlet 54 may be placed in tubular member 64 and positioned to allow coolant to drop onto fan blades 29 located on the opposite end of rotor assembly 20 from baffle 49.

Various modes of carrying out the invention are contemplated as being with the scope of the following claims particularly pointing out and distinctly claiming the subject matter which is regarded as the invention.

I claim:

1. An electric motor cooled by a liquid coolant comprising:
   a sealed casing, said casing having at least one inlet for admitting a liquid coolant and at least one outlet for removing coolant;
   an annular stator assembly mounted in said casing, said stator assembly including stator windings;
   a rotor assembly mounted in said motor to rotate within said stator assembly, said rotor assembly and said stator assembly defining a gap therebetween;

enclosure means for cooling said stator assembly connected in sealing engagement with said stator assembly and said casing to form an annular chamber around said stator assembly, said annular chamber adapted to accumulate liquid coolant from said inlet, the level of liquid coolant being maintained sufficiently high to at least partially immerse said stator assembly to provide heat transfer from said stator assembly to the liquid coolant, said annular chamber communicating with an outlet in said casing for removing coolant from said annular chamber;

a stationary baffle means and a conducting means for urging a liquid coolant into one end of said gap to provide heat transfer for cooling said rotor assembly and said stator assembly, said stationary baffle means disposed within said stator assembly to form a channel enclosing one end of said rotor assembly to channel the liquid coolant into said gap, said conducting means connected to conduct coolant from said annular chamber to said channel for providing a selected amount of coolant in said channel; and means for removing liquid and vaporized coolant from the other end of said gap.

2. The device as claimed in claim 1 and further including a distributing means connected to said rotor assembly and positioned in said channel to circumferentially distribute the coolant around said gap and to urge the said coolant axially through the gap.

3. The motor of claim 1 wherein said enclosure means comprises a pair of sealing rings and a pair of tubular members, one said sealing ring extending radially inward from said casing at each end of said stator assembly, one said tubular member extending axially from and connected to a corresponding sealing ring and connected to one end of said stator assembly to form an annular chamber so that said enclosure means said casing form an annular chamber around the outer periphery of said stator assembly.

4. The motor of claim 1 wherein said coolant distributing means comprises an end ring mounted on said rotor assembly.

5. The motor of claim 1 wherein said coolant distributing means comprises a fan means mounted on said rotor assembly.

6. The motor of claim 1 wherein said stator assembly includes laminated stator core with coil slots and wherein said stator field coils are positioned in said coil slots and having coil ends projecting beyond said laminated stator core, said stator field coils and ends being enclosed by said enclosure means for being cooled by the coolant in the annular chamber.

7. The motor of claim 1 for use in a refrigeration system wherein said motor drives a compressor connected in fluid series connection with a condenser for liquifying the refrigerant and an evaporator for vaporizing the refrigerant, wherein said coolant comprises the refrigerant of the system, and further including a coolant control means for establishing a selected level of coolant within the annular chamber, said coolant control means including a reservoir coupled to said condenser and to said inlet to receive liquified refrigerant and for controlling the coolant level within the annular chamber.

8. The electric motor of claim 1 wherein the axis of said annular chamber is horizontal and wherein said conducting means is connected to the lower portion of the annular chamber.

9. An electric motor from which heat may be removed by a liquid coolant, said motor comprising:

a sealed casing, said casing having at least one inlet for admitting a liquid coolant and at least one outlet for removing coolant;

an annular stator assembly mounted in said casing, said stator assembly including stator windings;

a rotor assembly mounted in said motor to rotate within siad stator assembly, said rotor assembly having at least a first coolant distributing means mounted on one end of said rotor assembly, said rotor assembly and said stator assembly defining a gap therebetween;

enclosure means connected in sealing engagement with said stator assembly and said casing to form an annular chamber entirely around said stator assembly, the annular chamber adapted to accumulate coolant from said inlet, said enclosure means comprising a pair of annuli and a pair of tube means, at each and of said stator assembly one said annulus extending radially inwardly from said casing and one said tube extending axially between and fastened to said stator assembly and to said annulus, coolant in the annular chamber cooling said stator assembly, the annular chamber communicating with said outlet for removing coolant from the annular chamber;

a stationary baffle means for forming a channel connected to one of said tube means, the channel enclosing said rotor assembly coolant distributing means to dam coolant and communicating with the gap for cooling said rotor assembly and said stator assembly; and a conducting means connected to conduct coolant from the annular chamber to the channel for providing a selected amount of coolant in the channel, coolant in the channel being driven circumferentially about the periphery of said rotor assembly by said coolant distributing means and urged through the gap by said coolant distributing means to provide heat transfer and cool said rotor and stator assemblies; the opposite end of the gap from said coolant distributing means communicating with said outlet for removing cooland from said gap.

10. The motor of claim 9 wherein said stationary baffle is mounted on said enclosure means for disposition within said annular stator assembly to form said channel.

11. The device of claim 6 wherein said enclosure means includes a dispensing outlet positioned to drop coolant from said annular chamber onto the end of said rotor assembly opposite from said first coolant distributing means.

* * * * *